(12) United States Patent
Sebbah et al.

(10) Patent No.: US 10,104,170 B2
(45) Date of Patent: Oct. 16, 2018

(54) SYSTEM AND METHOD OF ASSIGNING RESOURCE CONSUMERS TO RESOURCES USING CONSTRAINT PROGRAMMING

(71) Applicant: Oracle International Corporation, Redwood Shores, CA (US)

(72) Inventors: Samir Sebbah, Medford, MA (US); Michael Colena, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 236 days.

(21) Appl. No.: 14/988,294

(22) Filed: Jan. 5, 2016

(65) Prior Publication Data

US 2017/0195410 A1    Jul. 6, 2017

(51) Int. Cl.
    *H04L 29/08*      (2006.01)
    *H04L 12/24*      (2006.01)

(52) U.S. Cl.
    CPC ........ *H04L 67/1023* (2013.01); *H04L 41/145* (2013.01); *H04L 67/1095* (2013.01)

(58) Field of Classification Search
    CPC ....... H04L 41/145; H04L 43/08; H04L 41/14; G06F 8/63; G06F 2009/45562
    See application file for complete search history.

(56) References Cited

U.S. PATENT DOCUMENTS

| | | | | |
|---|---|---|---|---|
| 9,916,208 | B2 * | 3/2018 | Sebbah | ............... G06F 11/2094 |
| 2004/0199812 | A1 * | 10/2004 | Earl | .................... G06F 11/1446 |
| | | | | 714/13 |
| 2008/0126406 | A1 * | 5/2008 | Endabetla | .............. G06Q 10/06 |
| 2013/0238785 | A1 * | 9/2013 | Hawk | .................... G06F 9/5072 |
| | | | | 709/224 |
| 2013/0247034 | A1 * | 9/2013 | Messerli | ............. G06F 9/45533 |
| | | | | 718/1 |
| 2013/0304903 | A1 * | 11/2013 | Mick | ................... H04L 43/0817 |
| | | | | 709/224 |
| 2014/0059226 | A1 * | 2/2014 | Messerli | ............... G06F 9/5072 |
| | | | | 709/226 |

(Continued)

OTHER PUBLICATIONS

Hax et al., "Integer Programming", Applied Mathematical Programming, Addison-Wesley, 1977; available online at <http://web.mit.edu/15.053/www/AMP-Chapter-09.pdf>, pp. 1-48.

(Continued)

*Primary Examiner* — Ninos Donabed
(74) *Attorney, Agent, or Firm* — Invoke

(57) ABSTRACT

A system and method of assigning resource consumers to resources using constraint programming is disclosed. The resource consumers are to be assigned to the resources in a way that achieves one or more particular objectives, such as resiliency, load balancing, and network embedding criteria. A data model, for application to a constraint programming solver, formulates the assignment problem as a set of constraints for a solution to be found. The data model includes a first set of data model elements corresponding to pairs of resources, each pair having two resources in different failure domains. The data model includes a second set of data model elements corresponding to the resource consumers. The data model includes a constraint that limits assignment of the resource consumers to the resources to: assigning the resource consumers respectively to the pairs of resources.

18 Claims, 6 Drawing Sheets

(56) References Cited

U.S. PATENT DOCUMENTS

| | | | |
|---|---|---|---|
| 2014/0280433 A1* | 9/2014 | Messerli | H04L 67/06 709/201 |
| 2014/0289412 A1* | 9/2014 | Doddavula | H04L 41/5003 709/226 |
| 2015/0095343 A1* | 4/2015 | Divilly | H04L 67/28 707/741 |
| 2015/0095973 A1* | 4/2015 | Neumueller | G06F 21/6227 726/1 |

OTHER PUBLICATIONS

Oracle, "Database Storage Management", available online at <http://www.oracle.com/us/products/database/storage-management/overview/index.html>, retrieved on Jan. 25, 2016, 2 pages.

Datastax, "Creating a Solr index", available online at <http://docs.datastax.com/en/datastax_enterprise/4.0/datastax_enterprise/srch/srchldx.html>, retrieved on Jan. 25, 2016, 1 page.

Oracle, "Oracle Real-Time Scheduler", available online at <http://www.oracle.com/us/solutions/scm/service-optimization-suite-294193.html>, retrieved on Jan. 25, 2016, 1 page.

"Dynamically Provisioning Resources in an MWaaS Cloud", Enterprise Manager Cloud Administration Guide, available online at <https://docs.oracle.com/cd/E24628_01/doc.121/e28814/cloud_dyn_mwaas.htm>, retrieved on Feb. 12, 2016, 5 pages.

Oracle, "Exalogic Elastic Cloud", available online at <https://www.oracle.com/engineered-systems/exalogic/index.html>, retrieved on Jan. 25, 2016, 3 pages.

Foster et al., "Cloud Computing and Grid Computing 360-Degree Compared", Grid Computing Environments Workshop, GCE'08, IEEE, 2008, pp. 1-10.

Jaffar et al., "Constraint Logic Programming: A survey", The journal of logic programming, Elsevier, vol. 19, No. 20, 1994, pp. 503-581.

Global Constraint Catalog, "Global Cardinality", available online at <http://www.emn.fr/z-info/sdemasse/gccat/Cglobal_cardinality.html>, retrieved on Jan. 25, 2016, 4 pages.

Zhang et al., "Constraint Programming based Virtual Cloud Resources Allocation Model", International Journal of Hybrid Information Technology, vol. 6, No. 6, 2013, pp. 333-344.

Ardagna et al., "Quality-of-Service in Cloud Computing: Modeling Techniques and their Applications", Journal of Internet Services and Applications, vol. 5, No. 11, 2014, pp. 1-17.

Gavanelli et al., "Constraint Logic Programming", A. Dovier, E. Pontelli (Eds.): 25 Years of Logic Programming, LNCS 6125, 2010, pp. 64-86.

Oracle, "Distributed Caching", available online at <http://www.oracle.com/technetwork/middleware/coherence/distributed-caching-100021.html>, retrieved on Feb. 11, 2016, 2 pages.

* cited by examiner

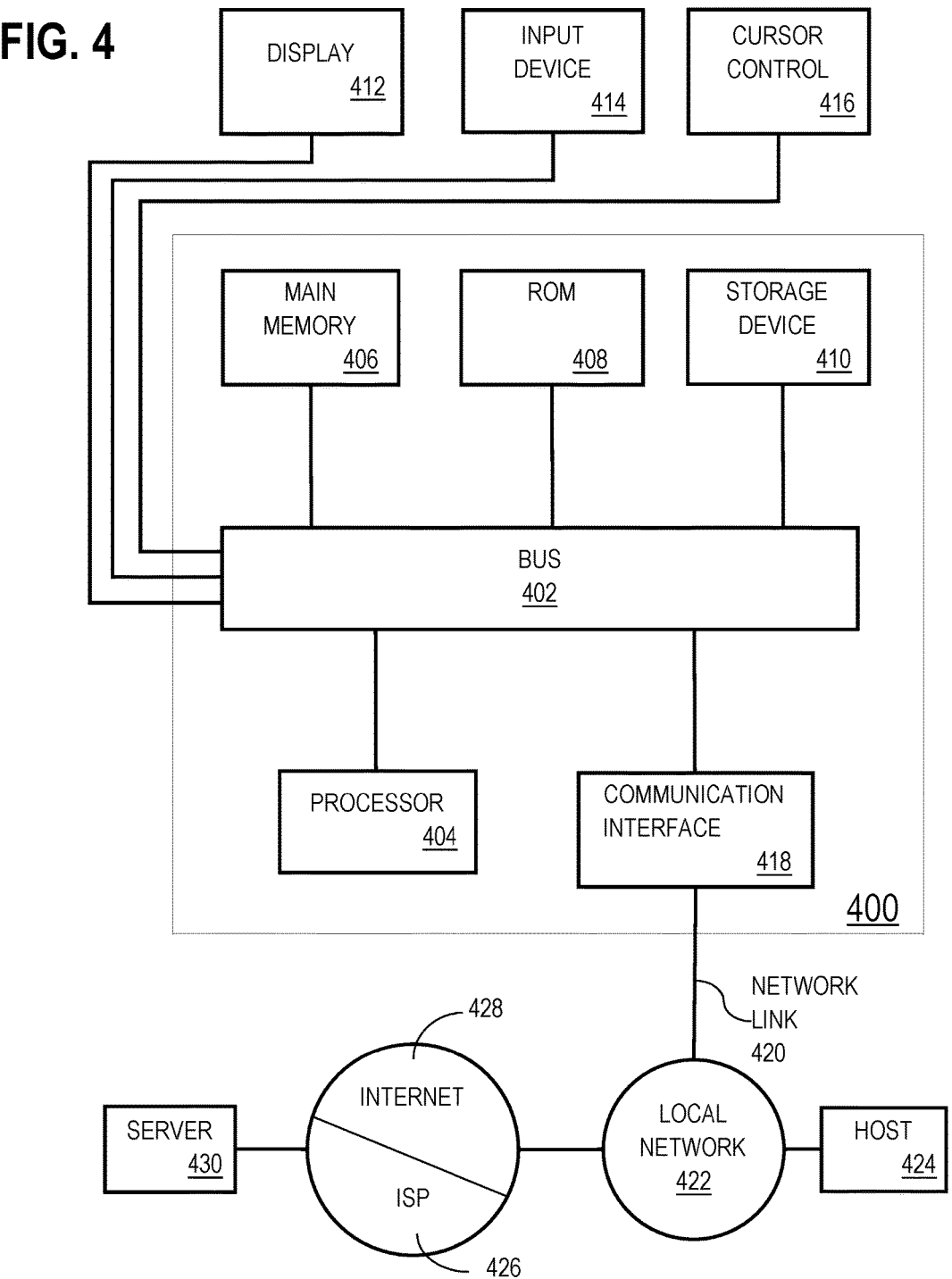

SYSTEM AND METHOD OF ASSIGNING RESOURCE CONSUMERS TO RESOURCES USING CONSTRAINT PROGRAMMING

INCORPORATION BY REFERENCE; RELATED APPLICATION

This application is related to U.S. Non-Provisional patent application Ser. No. 14/829,018, filed Aug. 28, 2015, which is hereby incorporated by reference.

TECHNICAL FIELD

The present disclosure relates to the use of constraint programming. In particular, the present disclosure relates to assigning resource consumers to resources using constraint programming.

BACKGROUND

In computer networks and cloud computing environments, a plurality of resources are shared by a plurality of resource consumers. Examples of resources include a processor, a server, a data storage, a virtual machine, and a platform. Examples of resource consumers include a job, a file, a data cache, and an application. The resources need to be allocated to the resource consumers in an optimal manner. If all resource consumers are assigned to a single resource, for example, then the remaining resources available in the computing system would not be efficiently used.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

Figure 1:
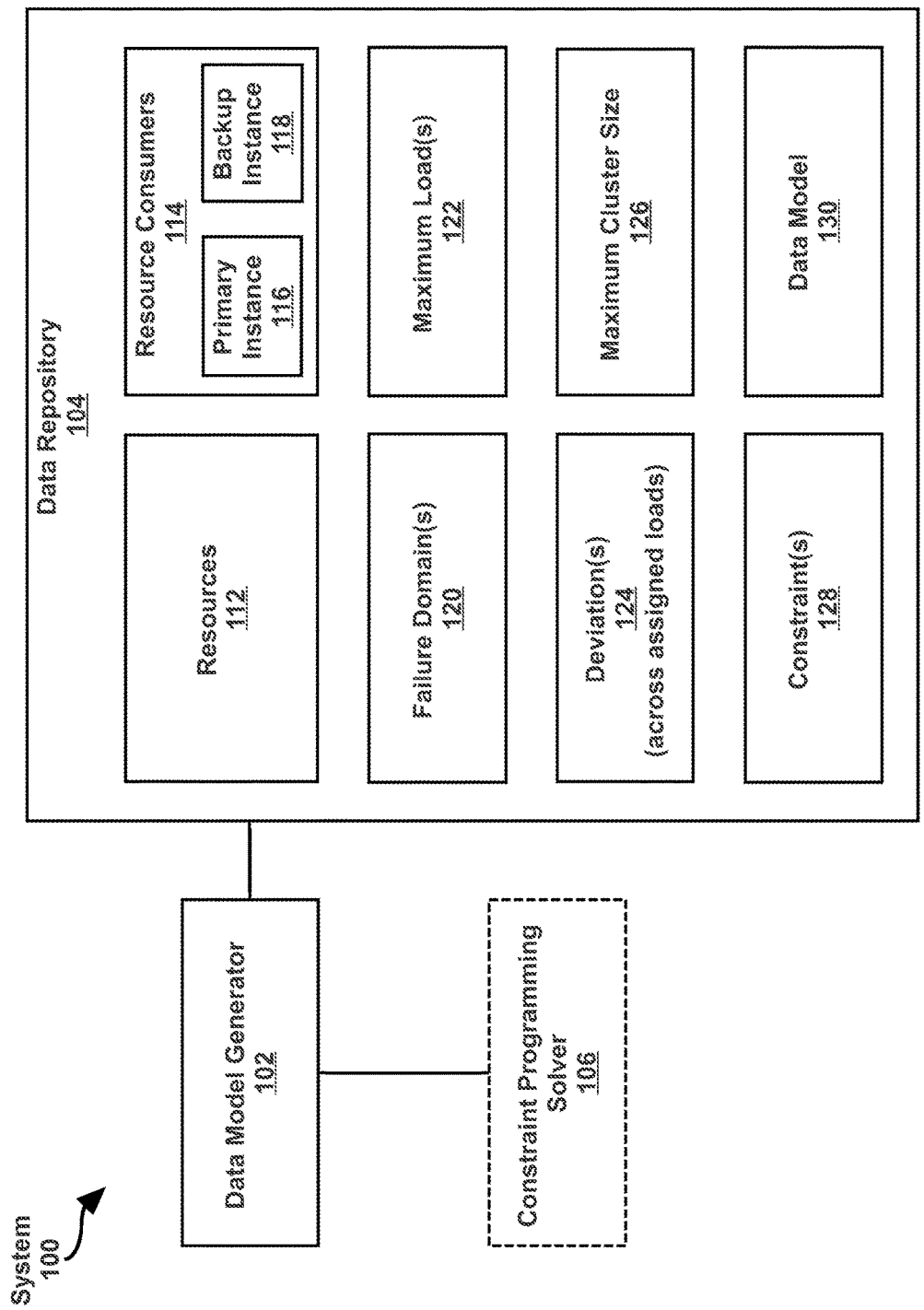
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DATA MODEL GENERATION SYSTEM
3. GENERATING A DATA MODEL FOR APPLICATION TO A CONSTRAINT PROGRAMMING SOLVER FOR ASSIGNING RESOURCE CONSUMERS TO RESOURCES
   A. IDENTIFYING RESOURCES AND RESOURCE CONSUMERS IN A COMPUTING SYSTEM
   B. SPECIFYING CONSTRAINTS
   C. GENERATING AND MODIFYING A DATA MODEL
4. EXAMPLE EMBODIMENT
   A. SOLUTION SATISFIES THE GLOBAL CARDINALITY CONSTRAINT
   B. SOLUTION SATISFIES THE PARTICULAR GLOBAL CARDINALITY CONSTRAINT CORRESPONDING TO PAIRS OF RESOURCES HAVING A PARTICULAR RESOURCE AS A PRIMARY RESOURCE
   C. SOLUTION SATISFIES THE FIRST DEVIATION CONSTRAINT AND THE SECOND DEVIATION CONSTRAINT
5. CLOUD ENVIRONMENTS
6. MISCELLANEOUS; EXTENSIONS
7. HARDWARE OVERVIEW

1. General Overview

One or more embodiments include generating a data model for application to a constraint programming solver for assigning resource consumers to resources. The resource consumers are to be assigned to the resources in a way that achieves one or more particular objectives, such as resiliency, load balancing, and network embedding criteria. Assigning resource consumers to resources while achieving one or more particular objectives is referred to herein as the "assignment problem."

In one or more embodiments, a data model, for application to a constraint programming solver, formulates the assignment problem as a set of constraints for a solution to be found. Specifying a set of constraints for a solution to be found is a form of declarative programming. In contrast specifying a sequence of steps for finding a solution is imperative programming. The number of constraints used in declarative programming is typically small when compared to the number of steps used in imperative programming. If there is a change to the number of resource consumers, number of resources, and/or objectives to be achieved, a small number of constraints (rather than a large number of steps) need to be updated. Hence, the data model is highly scalable to adapt to various variables used in the assignment problem.

In one or more embodiments, a data model to be applied to a constraint programming solver for solving the assignment problem includes a constraint that assigns each resource consumer to a pair of resources that are each in different failure domains. In an embodiment, the data model includes a constraint that limits an assigned load for each resource to be at or below a maximum load for the resource. In an embodiment, the data model includes a constraint that balances assigned loads across the resources. In an embodiment, the data model includes a constraint that limits network embedding to a maximum cluster size.

2. Data Model Generation System

FIG. 1 illustrates a system 100 in accordance with one or more embodiments. As illustrated in FIG. 1, system 100 includes a data model generator 102, a data repository 104, and, optionally, a constraint programming solver 106. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be implemented or may execute on the same computing system as data model generator 102 and/or constraint programming solver 106. Alternatively or additionally, data repository 104 may be implemented or executed on a separate computing system than data model generator 102 and/or constraint programming solver 106. Data repository 104 may be connected to data model generator 102 and/or constraint programming solver 106 via a direct connection or via a network.

Data sets describing resources 112, resource consumers 114, failure domain(s) 120, maximum load(s) 122, deviation(s) 124, maximum cluster size 126, constraint(s) 128, and data model 130 may be implemented across any of components within system 100. However, these data sets are illustrated within data repository 104 for purposes of clarity and explanation.

In one or more embodiments, resource 112 is a physical and/or virtual component of a computing system. Examples of resources include a processor, a server, a data storage, a virtual machine, and a platform. Resource 112 is configured to execute requests demanded by one or more resource consumers 114.

Each resource 112 may serve as a primary resource and/or a backup resource. A backup resource, assigned to a particular resource consumer 114, is a replica of a primary resource assigned to the particular resource consumer 114. The backup resource is used in case of failure, error, and/or other problems occurring with the primary resource.

In one or more embodiments, resource consumer 114 includes one or more operations and/or data objects that demand the use of one or more resources 112. Examples of resource consumers include a job, a file, a data cache, and an application.

Each resource consumer 114 may be associated with a primary instance 116 and a backup instance 118. Primary instance 116 and backup instance 118 are abstractions used to reference the assignment of a primary resource and a backup resource to a particular resource consumer 114. Primary instance 116 of a particular resource consumer 114 is assigned to a primary resource. Backup instance 118 of the particular resource consumer 114 is assigned to a backup resource.

Resources 112 may be centralized and shared amongst resource consumers 114 in a cloud environment. Resource consumers 114 independently demand computing capabilities, such as server time and network storage, as needed. Resources 112 are dynamically assigned to resource consumers 114 on an on-demand basis. The resources 112 assigned to each resource consumer 114 may be scaled upward or downward based on the computing capabilities required by the resource consumer 114. Additional embodiments and examples of cloud environments are described below in Section 5, titled "Cloud Environments."

In one or more embodiments, failure domain 120 is a particular set of resources 112 that share a single point of failure. A single point of failure is a common attribute affecting multiple resources 112. If a problem occurs with a single point of failure, then each resource 112 in a failure domain 120 also fails.

As an example, a particular set of resources 112 in a failure domain 120 may be a set of virtual machines running on a same physical machine. The physical machine would be a common attribute affecting each virtual machine. If a failure occurs with the physical machine (such as overheating), then the virtual machines running on the physical machine would also fail.

As another example, a particular set of resources 112 in a failure domain 120 may be a set of servers on a same server rack. If a failure occurs with the server rack (such as an interruption to the electricity delivered to the server rack), then the servers on the server rack would fail.

Failure domains 120 may be used in data model 130 to increase the resiliency of a computing system. Resiliency is the ability of a computing system to continue operation even if a failure occurs with one or more resources 112 of the computing system. The use of failure domains 120 is described below with reference to at least Operations 206-208 in FIG. 2A.

In one or more embodiments, maximum load 122 is a maximum number of resource consumers 114 that may be concurrently assigned to a particular resource 112. Different types of maximum loads 122 may be used, such as a primary maximum load and a backup maximum load. A primary maximum load is a maximum number of primary instances of resource consumers 114 that may be concurrently assigned to a particular resource 112. A backup maximum load is a maximum number of backup instances of resource consumers 114 that may be concurrently assigned to a particular resource 112. Each resource 112 may have a different value for maximum load 122.

In an embodiment, maximum load 122 is used in data model 130 to ensure that resources 112 are not overloaded. Overloading may result in inefficiencies, such as storing resource consumers 114 in a queue, and suspending the execution of requests of resource consumers 114. The use of maximum load 122 in data model 130 is described below with reference to at least Operations 206-208 in FIG. 2A.

In one or more embodiments, deviation 124 across assigned loads, for resources 112, is a measure of the variance or dispersion across the number of resource consumers 114 that are assigned to each resource 112 at a particular time. Examples of deviations 124 include a standard deviation, a mean absolute deviation, and a median absolute deviation. A deviation 124 of zero indicates that the assigned loads are balanced across resources 112. Load balancing may result in increasing throughput and/or minimizing response time. The use of deviations 124 in data model 130 is described below with reference to at least Operations 206-208 in FIG. 2A.

In one or more embodiments, maximum cluster size 126 is a maximum number of different backup resources that may be assigned to a particular set of resource consumers 114. The particular set of resource consumers 114 is the resource consumers 114 that are assigned to a same primary resource. Maximum cluster size 126 is used to strategically implement network embedding. In network embedding, backup resources for the particular set of resource consumers 114 are assigned to a same virtual network. Limiting the number of backup resources of the particular set of resource consumers 114 limits the size of the corresponding virtual network. Limiting the size of virtual networks in network embedding reduces latency and/or network traffic. The use of maximum cluster size 126 in data model 130 is described below with reference to at least Operations 206-208 in FIG. 2A.

In one or more embodiments, constraint 128 is a property of a solution to be found by constraint programming solver 106. The solution is an assignment of resources 112 to resource consumers 114 in a way that achieves one or more particular objectives, such as resiliency, load balancing, and network embedding. One or more constraints 128 are included in data model 130.

In one or more embodiments, data model 130 refers to a particular organization, structure, or representation of information. Data model 130 is generated by data model generator 102 based on resources 112, resource consumers 114, failure domain(s) 120, maximum load(s) 122, deviation(s) 124, maximum cluster size 126, and/or constraints 128. Data model 130 is input to constraint programming solver 106 for assigning resources 112 to resource consumers 114. Examples of operations for generating and applying data model 130 are described below with reference to FIGS. 2A-2C.

Data model 130 may include one or more data model elements. A first set of data model elements corresponds to resources 112. A second set of data model elements corresponds to resource consumers 114. Data model elements may also correspond to failure domain(s) 120, maximum load(s) 122, deviation(s) 124, and/or maximum cluster size 126.

A data model element may be associated with a domain. A domain is a set of possible values that may be assumed by or assigned to the data model element. As an example, a data model element may represent Resource Consumer X. Possible resources to be assigned to Resource Consumer X include Resource Y and Resource Z. A domain of the data model element may include Resource Y and Resource Z. As another example, a data model element may represent an assigned load for Resource R. Based on a maximum load for Resource R being 3, then 0, 1, 2, or 3 resource consumers may be assigned to Resource R. A domain of the data model element may be {0, 1, 2, 3}.

Data model 130 may refer to a software data structure. The software data structure is readable by a machine. The software data structure is an input to hardware and/or software configured to assign resources 112 to resource consumers 114, such as constraint programming solver 106. Data model elements are implemented as one or more data structure elements within the software data structure. As an example, a data structure element may be an array. The array corresponds to a data model element, while elements of the array correspond to the domain of the data model element. Other examples of data structure elements include vectors, linked lists, tables, variables, constants, and/or other software data objects.

In one or more embodiments, data model generator 102 refers to hardware and/or software configured to perform operations described herein for generating a data model for application to a constraint programming solver for assigning resource consumers to resources. Examples of operations for generating a data model for application to a constraint programming solver for assigning resource consumers to resources are described below with reference to FIGS. 2A-2C.

Data model generator 102 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, and/or a personal digital assistant ("PDA").

In one or more embodiments, constraint programming solver 106 refers to hardware and/or software configured to perform operations described herein for assigning resources 112 to resource consumers 114 based on data model 130. Constraint programming solver 106 may be implemented on one or more digital devices. Constraint programming solver 106 may be configured to apply constraint programming algorithms well-known in the art, such as backtracking and forward checking. Constraint programming solver 106 may be configured to assign resources 112 to resource consumers 114.

Figure 2A:
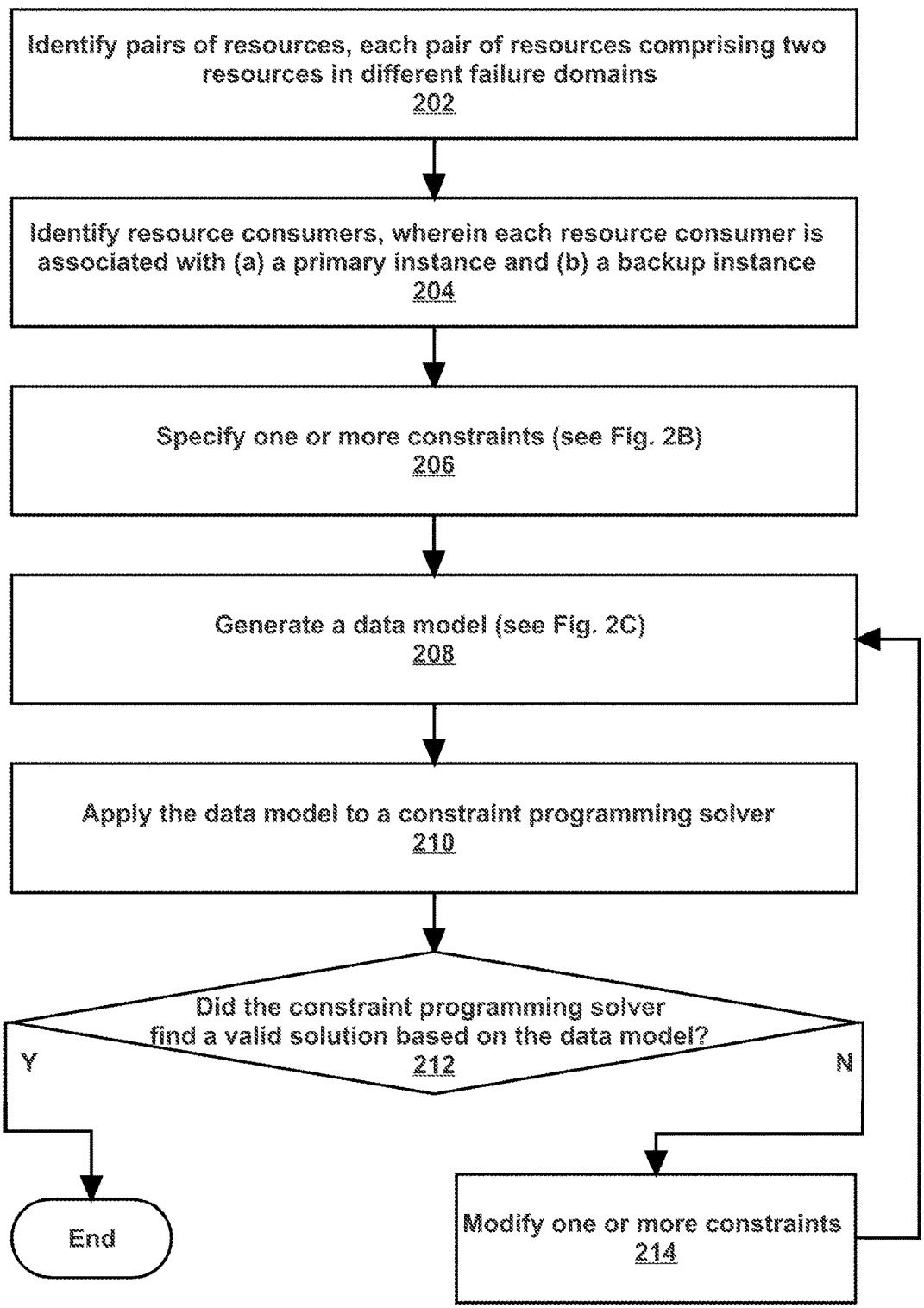
FIGS. 2A-2C illustrate example sets of operations for generating a data model for application to a constraint programming solver for assigning resource consumers to resources, in accordance with one or more embodiments.

3. Generating a Data Model for Application to a Constraint Programming Solver for Assigning Resource Consumers to Resources FIG. 2A illustrates an example set of operations for generating a data model for application to a constraint programming solver for assigning resource consumers to resources, in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

A. Identifying Resources and Resource Consumers in a Computing System

One or more embodiments include identifying pairs of resources. Each pair of resources comprises two resources in different failure domains (Operation 20). A set of resources available in a computing system, and a failure domain corresponding to each resource, are maintained by the computing system. As an example, a computing system may deploy a set of virtual machines on a set of physical machines. The computing system may maintain a log of which virtual machines are deployed on which physical machines. Additionally or alternatively, the set of resources available in a computing system is received from another application, database, and/or user input.

Pairs of resources may be identified by iterating through the set of resources. A first resource, of a first failure domain, is identified. Resources of all failure domains, other than the first failure domain, are identified. Pairs of resources are identified, each pair comprising (a) the first resource and (b) one of the resources of the other failure domains. Thus each pair comprises resources of different failure domains. The process iterates through each resource of the first failure domain to identify pairs of resources, each comprising (a) one of the resources of the first failure domain and (b) one of the resources of the other failure domains.

A second resource, of a second failure domain, is identified. Resources of all failure domains, other than the second failure domain, are identified. Pairs of resources are identified, each pair comprising (a) the second resource and (b) one of the resources of the other failure domains. Similarly, the process iterates through each resource of each failure domain. All possible pairs of resources, each comprising two resources of different failure domains, are identified.

Each pair of resources lists one resource in a first position and another resource in a second position. The pair (Resource A, Resource B) lists Resource A in a first position and Resource B in a second position. The pair (Resource A, Resource B) is different from the pair (Resource B, Resource A).

Data model elements representing each pair of resources may be generated. The data model elements are to be used in specifying one or more constraints and/or generating a data model, which is described below with reference to Operations 206 and 208.

One or more embodiments include identifying a set of resource consumers. Each resource consumer is associated with (a) a primary instance and (b) a backup instance (Operation 204). The set of resource consumers that demand computing capabilities of a computing system are monitored by the computing system. As an example, client devices may transmit requests of resource consumers to a computing system. As the computing system receives the resource consumers, the computing system may maintain a log of the resource consumers. Additionally or alternatively, the set of resource consumers is received from another application, database, and/or user input.

In an embodiment, a single data model element may represent both a primary instance and a backup instance of a particular resource consumer. In another embodiment, separate data model elements may represent a primary instance and a backup instance of a particular resource consumer. Data model elements, corresponding to each resource consumer, are used in specifying one or more constraints and/or generating a data model, which is described below with reference to Operations 206 and 208.

B. Specifying Constraints

Figure 2B:
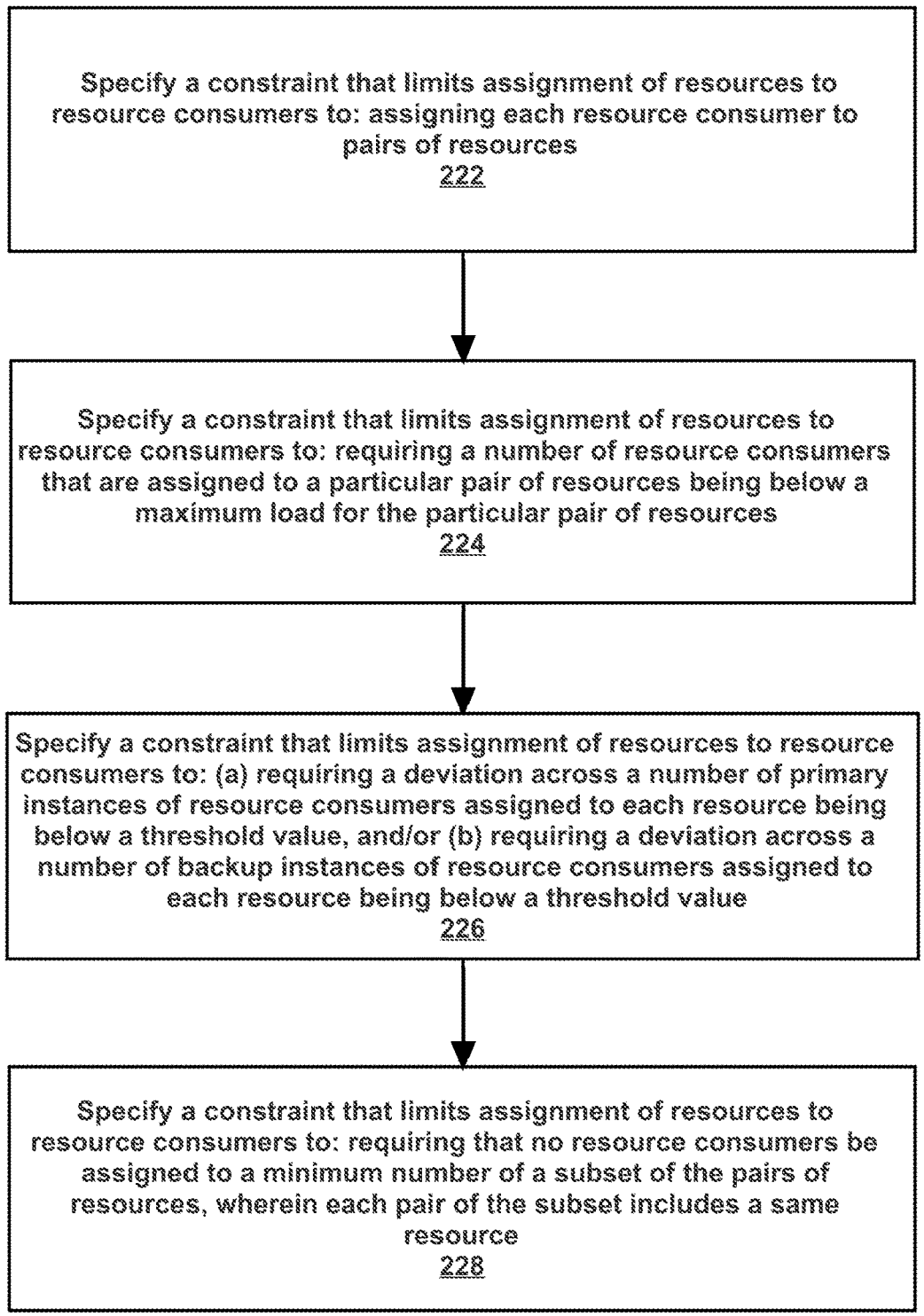

One or more embodiments include specifying one or more constraints (Operation 206). Constraints are specified based on one or more particular objectives that are to be achieved when assigning the resources to the resource consumers. Assignment of the resources available in a computing system to the resource consumers demanding computing capabilities of the computing system while achieving one or more particular objectives is referred to herein as the "assignment problem." Examples of objectives include: (a) increasing the resiliency of a computing system, (b) ensuring that resources are not overloaded, (c) load balancing, and (d) limiting networking embedding to a maximum cluster size. FIG. 2B illustrates an example set of operations for specifying one or more constraints.

I. Increasing the Resiliency of a Computing System

Referring to FIG. 2B, one or more embodiments include specifying a constraint. The constraint limits assignment of resources to resource consumers to: assigning each resource consumer to pairs of resources (Operation 222).

In an embodiment, an assignment objective includes increasing the resiliency of a computing system. The objective is pursued by (a) assigning a primary instance of a particular resource consumer to a primary resource and (b) assigning a backup instance of the particular resource consumer to a backup resource, wherein the primary resource and the backup resource are associated with different failure domains.

A constraint for the assignment may include limiting assignment of resources to resource consumers to: assigning each resource consumer, identified at Operation 204, to the pairs of resources, identified at Operation 202. Assignment of a resource consumer to a pair of resources identified at Operation 202 represents (a) assigning a primary instance of the resource consumer to a resource in a first position of the pair of resources and (b) assigning a backup instance of the resource consumer to another resource in a second position of the pair of resources. The resource in the first position serves as a primary resource for the resource consumer, while the resource in the second position serves as a backup resource for the resource consumer.

As an example, the following illustrates assignment of resource consumers to pairs of resources. Resource Consumer C may be assigned to a particular pair of resources (Resource X, Resource Y). Since Resource X is in a first position of the particular pair, a primary instance of Resource Consumer C would be assigned to Resource X. Since Resource Y is in a second position of the particular pair, a backup instance of Resource Consumer C would be assigned to Resource Y. Based on the assignment, Resource X would serve as a primary resource for Resource Consumer C. Resource Y would serve as a backup resource for Resource Consumer C.

II. Ensuring that Resources are not Overloaded Beyond Maximum Loads

Additionally or alternatively, one or more embodiments include specifying another constraint. The constraint limits assignment of resources to resource consumers to: requiring a number of resource consumers that are assigned to a particular pair of resources being below a maximum load for the particular pair of resources (Operation 224).

In an embodiment, an assignment objective includes ensuring that each resource is not overloaded beyond the resource's maximum load. In a scenario where each resource consumer is assigned to a pair of resources identified at Operation 202, the objective is pursued by limiting a number of resource consumers assigned to each pair of resources to be at or below the maximum load for the pair of resources.

A maximum load for each resource available in a computing system may be maintained by the computing system. Alternatively, a maximum load for each resource may be obtained from another application, database, and/or user input. The maximum load for each resource includes (a) a maximum number of primary instances of resource consumers that may be concurrently assigned to the resource, (b) a maximum number of backup instances of resource consumers that may be concurrently assigned to the resource, and/or (c) a maximum number of any instances (primary or backup) of resource consumers that may be concurrently assigned to the resource. A maximum number of primary instances of resource consumers that may be concurrently assigned to a resource is referred to herein as a "primary maximum load." A maximum number of backup instances of resource consumers that may be concurrently assigned to a resource is referred to herein as a "backup maximum load."

A maximum load for each pair of resources may be determined based on the corresponding primary maximum load and the corresponding backup maximum load. A maximum load for a pair of resources, (Resource A, Resource B), is determined as the lesser of (a) the primary maximum load for Resource A, and (b) the backup maximum load for Resource B.

Alternatively, a maximum load for a pair of resources, (Resource A, Resource B), is determined as the lesser of (a) a maximum number of any instances of resource consumers that may be concurrently assigned to Resource A, and (b) a maximum number of any instances of resource consumers that may be concurrently assigned to Resource B.

A constraint for the assignment problem may include limiting assignment of resources to resource consumers to:

requiring a number of resource consumers that are assigned to a particular pair of resources being below a maximum load for the particular pair of resources. A particular resource consumer is counted as a resource consumer that is assigned to a particular pair of resources, (Resource A, Resource B), if both (a) a primary instance of the particular resource consumer is assigned to Resource A and (b) a backup instance of the particular resource is assigned to Resource B. A number of resource consumers that are assigned to a particular pair of resources is referred to herein as an "assigned load" for the particular pair of resources.

As an example, the following illustrates how a number of assigned loads for pairs of resources are determined. The following assignments may have been made:

Resource Consumer P—assigned to Pair (Resource X, Resource Y)

Resource Consumer Q—assigned to Pair (Resource X, Resource Y)

Resource Consumer R—assigned to Pair (Resource Y, Resource X)

An assigned load for Pair (Resource X, Resource Y) would be 2. An assigned load for Pair (Resource Y, Resource X) would be 1.

III. Balancing Assigned Loads Across Resources

Additionally or alternatively, one or more embodiments include specifying another constraint. The constraint limits assignment of resources to resource consumers to: (a) requiring a deviation across a number of primary instances of resource consumers assigned to each resource being below a threshold value, and/or (b) requiring a deviation across a number of backup instances of resource consumers assigned to each resource being below a threshold value (Operation 226).

In an embodiment, an assignment objective includes balancing assigned loads across a set of resources. In a scenario where each resource consumer is assigned to a pair of resources identified at Operation 202, the objective is pursued by minimizing (a) a first deviation across a number of primary instances of resource consumers assigned to each resource, and/or (b) a second deviation across a number of back up instances of resource consumers assigned to each resource.

A constraint for the assignment problem may include limiting assignment of resources to resource consumers to: (a) requiring a first deviation across a number of primary instances of resource consumers assigned to each resource being below a first threshold value, and/or (b) requiring a second deviation across a number of backup instances of resource consumers assigned to each resource being below a second threshold value. A number of primary instances of resource consumers assigned to a particular resource is referred to herein as a "primary assigned load" for the particular resource. A number of backup instances of resource consumers assigned to a particular resource is referred to herein as a "backup assigned load" for the particular resource. The first threshold value may be the same as or different from the second threshold value.

In an embodiment, primary assigned loads and backup assigned loads, for each resource, is determined based on the assigned loads for the pairs of resources. A primary assigned load for a particular Resource X is the sum of the assigned loads for pairs of resources having Resource X in the first position in the pair. A backup assigned load for Resource X is the sum of the assigned loads for pairs of resources having Resource X in the second position in the pair.

As an example, the following illustrates determining primary assigned loads and backup assigned loads, for each resource, using assigned loads for the pairs of resources. The following assignments may have been made:

Resource Consumer P—assigned to Pair (Resource X, Resource Y)

Resource Consumer Q—assigned to Pair (Resource X, Resource Y)

Resource Consumer R—assigned to Pair (Resource X, Resource Z)

Resource Consumer S—assigned to Pair (Resource Y, Resource X)

Resource Consumer T—assigned to Pair (Resource W, Resource X)

An assigned load for Pair (Resource X, Resource Y) would be 2. An assigned load for Pair (Resource X, Resource Z) would be 1. An assigned load for Pair (Resource Y, Resource X) would be 1. An assigned load for Pair (Resource W, Resource X) would be 1.

A primary assigned load for Resource X would be the sum of (a) the assigned load for Pair (Resource X, Resource Y) and (b) the assigned load for Pair (Resource X, Resource Z). The primary assigned load for Resource X would be determined as 3 (which is, 2+1).

A backup assigned load for Resource X would be the sum of (a) the assigned load for Pair (Resource Y, Resource X) and (b) the assigned load for Pair (Resource W, Resource X). The backup assigned load for Resource X would be determined as 2 (which is, 1+1).

IV. Limiting Network Embedding to a Maximum Cluster Size

Additionally or alternatively, one or more embodiments include specifying another constraint. The constraint limits assignment of resources to resource consumers to: requiring that no resource consumers be assigned to a minimum number of a subset of the pairs of resources, wherein each pair of the subset includes a same resource (Operation 228).

In an embodiment, an assignment objective includes limiting network embedding to a maximum cluster size. The objective is pursued by assigning backup instances of a particular set of resource consumers to a number of backup resources that is less than or equal to the maximum cluster size, wherein the primary instances of the particular set of resource consumers are assigned to a same primary resource. The backup instances of the particular set of resource consumers may be of the same or different failure domains.

As an example, a maximum cluster size in a computing system may be 2. A primary instance of Resource Consumer X, a primary instance of Resource Consumer Y, and a primary instance of Resource Consumer Z may be assigned to Resource P. Resource Consumer X, Resource Consumer Y, and Resource Consumer Z would be a particular set of resource consumers having primary instances assigned to a same resource, Resource P. Based on the maximum cluster size, the backup instance of Resource X, the backup instance of Resource Y, and the backup instance of Resource Z may be assigned to a maximum of two different resources.

In a scenario where each resource consumer is assigned to a pair of resources identified at Operation 202, a constraint for the assignment problem may include limiting assignment of resources to resource consumers to: requiring that no resource consumers be assigned to a minimum number of a subset of the pairs of resources, wherein each pair of the subset includes a same resource. The minimum number of pairs of resources, that need to be assigned no resource consumers, is determined as the difference between (a) a number of pairs of resources having a particular resource in the first position of the pair and (b) the maximum cluster size.

As an example, the following illustrates how the constraint is used to achieve the objective. A maximum cluster size may be 3. The following may be a list of pairs of resources in a computing system, wherein each pair includes (a) Resource R in a first position (serving as a primary resource), and (b) another resource, of a failure domain different than that of Resource P, in a second position (serving as a backup resource):

Pair (Resource R, Resource A)
Pair (Resource R, Resource B)
Pair (Resource R, Resource C)
Pair (Resource R, Resource D)

Continuing this example, four resource consumers may have been identified in the computing system, Resource Consumer W, Resource Consumer X, Resource Consumer Y, and Resource Consumer Z. If each of the four resource consumers were assigned to a different pair, of the listed pairs, then the four resource consumers would have (a) primary instances assigned to a same resource (Resource R) and (b) backup instances assigned to four different resources (Resource A, Resource B, Resource C, and Resource D). This assignment would violate the maximum cluster size of 3. This assignment was not limited by a minimum number of listed pairs that must be assigned to no resource consumers.

Continuing this example, the minimum number of listed pairs to be assigned no resource consumers may be determined as the difference between (a) a number of pairs of resources having Resource R in the first position of the pair and (b) the maximum cluster size. Since the number of pairs of resources having Resource R in the first position of the pair is 4, the minimum number of listed pairs would be 1 (which is, 4–3). A constraint would be to require that no resource consumers be assigned to at least one of the listed pairs.

Observing the constraint, the four resource consumers may be assigned to three of the listed pairs, as follows:

Resource Consumer W—assigned to Pair (Resource R, Resource A)
Resource Consumer X—assigned to Pair (Resource R, Resource B)
Resource Consumer Y—assigned to Pair (Resource R, Resource C)
Resource Consumer Z—assigned to Pair (Resource R, Resource C)

Based on this assignment, the four resource consumers would have (a) primary instances assigned to a same resource (Resource R) and (b) backup instances assigned to three different resources (Resource A, Resource B, and Resource C). This assignment would satisfy the maximum cluster size of 3.

C. Generating and Modifying a Data Model

Figure 2C:
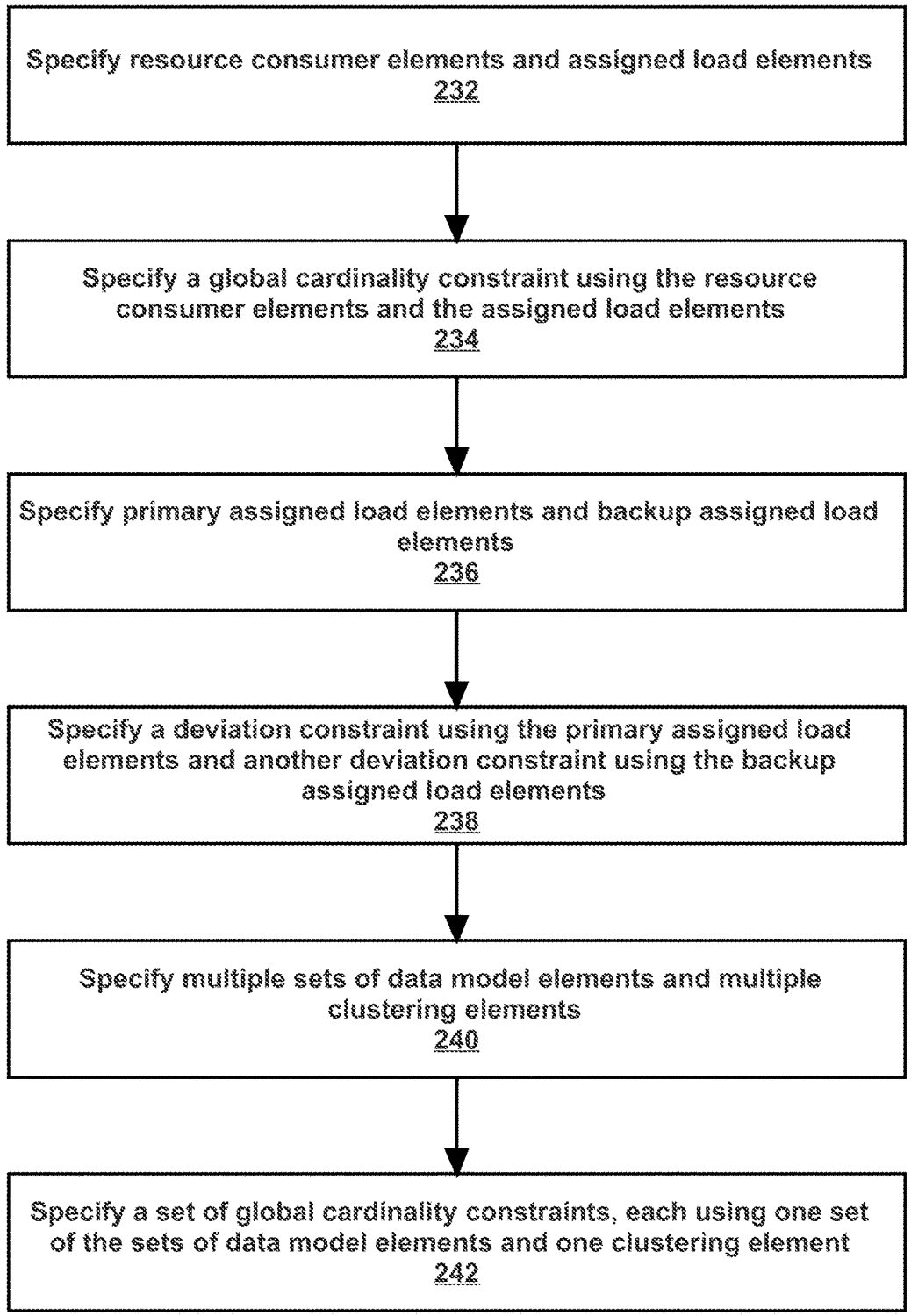

Referring back to FIG. 2A, one or more embodiments include generating a data model (Operation 208). The data model includes one or more data model elements, global cardinality constraints, and/or deviation constraints. FIG. 2C illustrates examples of operations for generating a data model.

Referring to FIG. 2C, one or more embodiments include specifying resource consumer elements and assigned load elements (Operation 232). The resource consumer elements and assigned load elements are specified in a scenario where the data model includes: (a) a first constraint that limits assignment of resources to resource consumers to: assigning each resource consumer, identified at Operation 204, to the pairs of resources, identified at Operation 202, and (b) a second constraint that limits assignment of resources to resource consumers to: requiring a number of resource consumers that are assigned to a particular pair of resources being below a maximum load for the particular pair of resources.

The resource consumer elements and assigned load elements are data model elements used to specify the first constraint and the second constraint. Each resource consumer element represents a resource consumer, identified at Operation 204. The domain of each resource consumer element includes the pairs of resources, identified at Operation 202. The specification of the resource consumer elements and the corresponding domains limit a possible set of values to be assigned to each resource consumer to a primary resource and a backup resource of different failure domains.

As an example, the following illustrates how the resource consumer elements and domains are specified. Resource A and Resource B may be associated with Failure Domain X. Resource C may be associated with Failure Domain Y. A pair of resources, including resources of two different failure domains, would be (Resource A, Resource C). Additional pairs of resources would include (Resource B, Resource C), (Resource C, Resource A), and (Resource C, Resource B). A domain of a resource consumer element would be include the pairs of resources, as follows {(Resource A, Resource C), (Resource B, Resource C), (Resource C, Resource A), (Resource C, Resource B)}.

Each assigned load element counts the assigned load for each pair of resources identified at Operation 202. A domain for an assigned load element, for a particular pair of resources, is a list of consecutive numbers ranging from zero to the maximum load for the particular pair of resources. The specification of the assigned load elements and the corresponding domains limits a possible set of values to be assumed by an assigned load for a particular pair of resources to be at or below the maximum load for the particular pair of resources.

As an example, the following illustrates how the assigned load elements and domains are specified. A maximum load for a first resource may be 3, and a maximum load for a second resource may be 4. A maximum load for a pair of resources comprising the first resource and the second resource would be the lesser of (a) the maximum load of the first resource and (b) the maximum load of the second resource, which is determined to be 3. A domain of an assigned load element, for the pair, would be {0, 1, 2, 3}.

One or more embodiments include specifying a global cardinality constraint using the resource consumer elements and the assigned load elements (Operation 234). The global cardinality constraint is used to specify the first constraint and the second constraint included in the data model.

A global cardinality constraint accepts three parameters: a first set of data model elements (referred to herein as "variable elements"), a second set of data model elements (referred to herein as "value elements"), and a third set of data model elements (referred to herein as "counting elements").

Variable elements represent a set of variables, each having a domain. Each variable is to be assigned a value in the corresponding domain. A variable may not be assigned to a value that is not in the corresponding domain. As an example, variable elements may be the resource consumer elements. Each resource consumer element would be assigned a value in the corresponding domain, which is a pair of resources identified at Operation 202. A resource consumer element may not be assigned to a value not in the corresponding domain, such as a pair of resources in the same failure domain.

Value elements represent a list of values that may be assigned to one or more variable elements. Value elements may include all or a subset of values in any of the domains of the variable elements. As an example, value elements may include each pair of resources identified at Operation 202.

Counting elements represent a set of counters, each having a domain. Each counter counts a number of times that a particular value has been assigned to any of the variable elements. Each counter may assume a value in the corresponding domain. A counter may not assume a value that is not in the corresponding domain. Based on the counting elements, the global cardinality constraint limits the number of times that a particular value may be assigned to any of the variable elements. As an example, counting elements may be the assigned load elements. Each assigned load element may only assume a value in the corresponding domain, which is a number equal to or less than a maximum load for a particular pair of resources.

Each counting element corresponds to each value element. A first counting element counts the number of times that a first value element has been assigned. A second counting element counts the number of times that a second value element has been assigned. The domain of a particular counting element is determined based on attributes of the corresponding value element.

As an example, the following illustrates the correspondence between counting elements and value elements. Value elements may be pairs of resources identified at Operation 202, including (a) Pair X and (b) Pair Y. Counting elements may be assigned loads for the pairs of resources, including (a) an assigned load for Pair X and (b) an assigned load for Pair Y. The first counting element (representing the assigned load for Pair X) would count the number of times that the first value element (representing Pair X) has been assigned. Since the maximum number of times that Pair X may be assigned is the maximum load for Pair X, the domain of the first counting element would be numbers between 0 and the maximum load for Pair X.

Similarly, the second counting element (representing the assigned load for Pair Y) would count the number of times that the second value element (representing Pair Y) has been assigned. Since the maximum number of times that Pair Y may be assigned is the maximum load for Pair Y, the domain of the second counting element would be numbers between 0 and the maximum load for Pair Y.

In an embodiment, the resource consumer elements are input as variable elements of a global cardinality constraint. The pairs of resources identified at Operation 202 are input as value elements of the global cardinality constraint. The assigned load elements are input as counting elements of the global cardinality constraint.

Based on the inputs, the global cardinality constraint specifies the following properties for a solution to the assignment problem: (a) each resource consumer element may only be assigned to a value in the corresponding domain, (b) each pair of resources is assigned, to the resource consumer elements, a number of times that is equal to a value assumed by the corresponding assigned load element, and (c) each assigned load element may only assume a value in the corresponding domain. The domain of each assigned load element is limited to numbers that are equal to or less than a maximum load for the corresponding resource.

One or more embodiments include specifying primary assigned load elements and backup assigned load elements (Operation 236). The primary assigned load elements and the backup assigned load elements are specified in a scenario where the data model includes a third constraint that limits assignment of resources to resource consumers to: (a) requiring a first deviation across a number of primary instances of resource consumers assigned to each resource being below a first threshold value and/or (b) requiring a second deviation across a number of backup instances of resource consumers assigned to each resource being below a second threshold value.

Primary assigned load elements are a set of data model elements used to specify the third constraint. Each primary assigned load element represents a number of primary instances of resource consumers assigned to each resource. A domain for a primary assigned load element, for a particular resource, is a list of consecutive numbers ranging from zero to the primary maximum load for the particular resource.

Additionally or alternatively, backup assigned load elements are a set of data model elements used to specify the third constraint. Each backup assigned load element represents a number of backup instances of resource consumers assigned to each resource. A domain for a backup assigned load element, for a particular resource, is a list of consecutive numbers ranging from zero to the backup maximum load for the particular resource.

One or more embodiments include specifying a deviation constraint using the primary assigned load elements and another deviation constraint using the backup assigned load elements (Operation 238). A deviation constraint using the primary assigned load elements is used to specify the third constraint included in the data model. The deviation constraint accepts as input: (a) the primary assigned load elements and (b) the first threshold value. The deviation constraint determines a first deviation across the primary assigned loads. The deviation constraint limits the first deviation to be at or below the first threshold value.

In an embodiment, the first threshold value has a domain running from zero to a maximum acceptable value for the first deviation. As an example, the first deviation may be a mean absolute deviation. The domain of the first threshold value would be a set of integers running from zero to a maximum acceptable value for the first deviation. The deviation constraint ensures that the first deviation, in a solution to the assignment problem, (a) is the smallest possible value in the domain of the first threshold value, and (b) is less than the maximum acceptable value for the first deviation. If a valid solution is found in the case where the first threshold value is zero, then the solution would assign a same number of primary instances of resource consumers to each resource.

Additionally or alternatively, a deviation constraint using the backup assigned load elements is used to specify the third constraint included in the data model. The deviation constraint accepts as input: (a) the backup assigned load elements and (b) the second threshold value. The deviation constraint determines a second deviation across the backup assigned loads. The deviation constraint limits the second deviation to be at or below the second threshold value.

In an embodiment, the second threshold value has a domain running from zero to a maximum acceptable value for the second deviation. As an example, the second deviation may be a mean absolute deviation. The domain of the second threshold value would be a set of integers running from zero to a maximum acceptable value for the first deviation. The deviation constraint ensures that the second deviation, in a solution to the assignment problem, (a) is the smallest possible value in the domain of the second threshold value, and (b) is less than the maximum acceptable value for the second deviation. If a valid solution is found in the case where the second threshold value is zero, then the solution would assign a same number of backup instances of resource consumers to each resource.

One or more embodiments include specifying multiple sets of data model elements and multiple clustering elements (Operation 240). The multiple sets of data model elements and the multiple clustering elements are specified in a scenario where the data model includes a fourth constraint that limits assignment of resources to resource consumers to: requiring that no resource consumers be assigned to a minimum number of a subset of the pairs of resources, wherein each pair of the subset includes a same resource. The minimum number of pairs of resources, that need to be assigned no resource consumers, is determined as the difference between (a) a number of pairs of resources having a particular resource in the first position of the pair and (b) the maximum cluster size.

The multiple sets of data model elements and multiple clustering elements are data model elements used to specify the fourth constraint. The multiple sets of data model elements may include a first set of data model elements, a second set of data model elements, and/or additional sets of data model elements. Each set of data model elements represents assigned loads for pairs of resources having a particular resource serving as a primary resource.

Each of the first set of data model elements represents an assigned load for each pair of resources having a first resource serving as a primary resource. A domain for each of the first set of data model elements is a list of consecutive numbers ranging from zero to the maximum load for the corresponding pair.

Similarly, each of the second set of data model elements represents an assigned load for each pair of resources having a second resource serving as a primary resource. A domain for each of the second set of data model elements is a list of consecutive numbers ranging from zero to the maximum load for the corresponding pair. Additional sets of data model elements may be similarly specified.

The multiple clustering elements may include a first clustering element, a second clustering element, and/or additional clustering elements. A particular clustering element represents a number of pairs of resources, having a particular resource as the primary resource, that have been assigned no resource consumers.

A first clustering element represents a number of pairs of resources, having a first resource as the primary resource, that have been assigned no resource consumers. The smallest value in the domain of the first clustering element is a minimum number of pairs, having the first resource as the primary resource, that need to be assigned no resource consumers. As an example, a domain for the first clustering element may be a list of consecutive numbers ranging from (a) a minimum number of pairs, having the first resource as the primary resource, that need to be assigned no resource consumers, to (b) the number of pairs having the first resource as the primary resource minus one. As another example, a domain for the first clustering element may be a list of consecutive numbers ranging from (a) a minimum number of pairs, having the first resource as the primary resource, that need to be assigned no resource consumers, to (b) the number of pairs having the first resource as the primary resource. The specification of the first clustering element and the corresponding domain limits a possible set of values to be assumed by the first clustering element (representing a number of pairs of resources assigned to no resource consumers) to be at or above the minimum number of pairs that need to be assigned no resource consumers.

As an example, the following illustrates how the clustering element and domain are specified. A maximum cluster size for a computing system may be 3. The following may be a list of pairs of resources in a computing system, wherein each pair includes (a) Resource R in a first position (serving as a primary resource), and (b) another resource, of a failure domain different than that of Resource P, in a second position (serving as a backup resource):

Pair (Resource R, Resource A)
Pair (Resource R, Resource B)
Pair (Resource R, Resource C)
Pair (Resource R, Resource D)

The minimum number of listed pairs to be assigned no resource consumers may be determined as the difference between (a) the number of pairs of resources having Resource R in the first position of the pair and (b) the maximum cluster size. Since the number of pairs of resources having Resource R in the first position of the pair is 4, the minimum number of listed pairs would be 1 (which is, 4−3).

Continuing this example, a clustering element representing a number of pairs of resources, having Resource R as the primary resource, that have been assigned no resource consumers may be generated. A domain for the clustering element would start from the minimum number of listed pairs that need to be assigned no resources, which is 1. The domain would end at the number of listed pairs minus one, which is 3 (which is, 4−1). The domain would be {1, 2, 3}.

Similarly, a second clustering element represents a number of pairs of resources, having a second resource as the primary resource, that have been assigned no resource consumers. A domain for the second clustering element is a list of consecutive numbers ranging from (a) a minimum number of pairs, having the second resource as the primary resource, that need to be assigned no resource consumers, to (b) the number of pairs having the second resource as the primary resource. Additional clustering elements may be similarly specified.

One or more embodiments include specifying a set of global cardinality constraints, each using one set of the multiple sets of data model elements, identified at Operation 240, and one clustering element of the multiple clustering elements, identified at Operation 240 (Operation 242). The set of global cardinality constraints are used to specify the fourth constraint included in the data model.

The set of global cardinality constraints may include a first global cardinality constraint, a second global cardinality constraint, and/or additional global cardinality constraints.

The first global cardinality constraint accepts the first set of data model elements, specified at Operation 240, as variable elements. The first global cardinality constraint accepts a single value, zero, as a value element. The first global cardinality constraint accepts the first clustering element as a counting element.

Based on the inputted variable elements, value element, and counting element, the first global cardinality constraint specifies the following properties for a solution to the assignment problem: (a) each data model element in the first set may only assume a value in the corresponding domain, (b) the value zero is assumed, by the first set of data model elements, a number of times that is equal to a value assumed by the first clustering element, and (c) the first clustering element may only assume a value in the corresponding domain. The domain of the first clustering element is limited to numbers that are equal to or greater than: a minimum number of pairs of resources having the first resource as a primary resource that need to be assigned no resources. The first global cardinality constraint ensures that no resource consumers are assigned to a minimum number of a subset of the pairs of resources, wherein each pair of the subset includes the first resource.

Similarly, the second global cardinality constraint accepts the second set of data model elements, specified at Operation 240, as variable elements. The second global cardinality constraint accepts a single value, zero, as a value element. The second global cardinality constraint accepts the second clustering element as a counting element. The second global cardinality constraint ensures that no resource consumers are assigned to a minimum number of a subset of the pairs of resources, wherein each pair of the subset includes a second resource. Additional global cardinality constraints may be similarly specified.

Returning back to FIG. 2A, one or more embodiments include applying the data model to a constraint programming solver (Operation 210). The data model is input as a parameter to the constraint programming solver.

The constraint programming solver may be configured to apply one or more constraint programming algorithms that are well-known in the art. Constraint programming algorithms well-known in the art include, for example, backtracking and forward-checking algorithms.

A constraint programming solver may process each resource consumer element sequentially to find a solution to an assignment problem. A domain of a current resource consumer element is identified. A value of the domain is temporarily assigned to the current resource consumer element. If this assignment violates at least one of (a) the global cardinality constraint, (b) the first deviation constraint, (c) the second deviation constraint, and/or (d) the set of global cardinality constraints, then another value of the domain is temporarily assigned to the current resource consumer element. If all resources in the domain are attempted and do not satisfy the constraints, then a re-assignment of a previous resource consumer element is made.

A value of the domain of the previous resource consumer element had been temporarily assigned to the previous resource consumer element. Based on the need for re-assignment, another value of the domain of the previous resource consumer element is temporarily assigned to the previous resource consumer element. Then, assignment of the current resource consumer element is reattempted.

The constraint programming solver iterates through each resource consumer element, until all resource consumer elements are assigned to a value of the corresponding domain, without violating one or more of (a) the global cardinality constraint, (b) the first deviation constraint, (c) the second deviation constraint, and/or (d) the set of global cardinality constraints. The temporary assignments are determined to be final assignments. The final assignments are returned as a valid solution to the assignment problem.

Alternatively, the constraint programming solver iterates through each resource consumer element, until all variations of assignments for the resource consumer elements have been attempted and yet none of the assignments would satisfy one or more of (a) the global cardinality constraint, (b) the first deviation constraint, (c) the second deviation constraint, and/or (d) the set of global cardinality constraints.

One or more embodiments include inquiring whether the constraint programming solver found a valid solution based on the data model (Operation 212). If the constraint programming solver returned final assignments for the resource consumer elements, then a valid solution was found.

In contrast, if the constraint programming solver could not make assignments for all resource consumer elements in a way that does not violate one or more of (a) the global cardinality constraint, (b) the first deviation constraint, (c) the second deviation constraint, and/or (d) the sets of global cardinality constraints, then no valid solution was found. The constraint programming solver returns a message indicating that no valid solution was found, such as an error code.

In one or more embodiments, if a valid solution was found, then the process ends. If no valid solution was found, then one or more constraints are modified (Operation 214). One or more of the input parameters of the data model may be modified.

In an embodiment, the maximum acceptable value of the first deviation and/or the maximum acceptable value of the second deviation may be increased. Increasing the maximum acceptable values would expand the domain of the first threshold value (which is used in the first deviation constraint) and/or the domain of the second threshold value (which is used in the second deviation constraint). As an example, an initial maximum acceptable value of the first deviation may be 4. An initial domain of the first threshold value may be $\{0, 1, 2, 3, 4\}$. The first deviation constraint, using the initial domain of the first threshold value, may be included in a data model. If no valid solution is found for the data model, then the maximum acceptable value of the first deviation may be increased to 6. The modified domain of the first threshold value may be $\{0, 1, 2, 3, 4, 5, 6\}$. The first deviation constraint using the modified domain of the first threshold value, may be included in a modified data model. By increasing the maximum acceptable values for the first deviation and/or the second deviation, a solution to the assignment problem may result in a larger deviation across the primary assigned loads and/or the backup assigned loads, and therefore a reduction in the load balancing of the resources in the computing system.

In an embodiment, other modifications may be made. As an example, the classification of resources in various failure domains may be modified. The size of a failure domain may be decreased. The change in the failure domains would result in different pairs of resources being identified, wherein each pair includes one resource of one modified failure domain and another resource of another modified failure domain. The change in the pairs of resources would result in corresponding changes to at least the domains of the resource consumer elements, and the global cardinality constraint.

As another example, a maximum cluster size may be increased. The change in the maximum cluster size would result in corresponding changes to at least the clustering elements, and the set of global cardinality constraints.

One or more embodiments include generating a modified data model, based on the modified constraints (Operation 208). The modified data model is applied to the constraint programming solver (Operation 210). An inquiry is made as to whether the constraint programming solver found a valid solution based on the modified data model (Operation 212). If yes, then the process ends. If no, then one or more constraints are again modified. The process continues until a valid solution is found.

4. Example Embodiment

Figure 3:
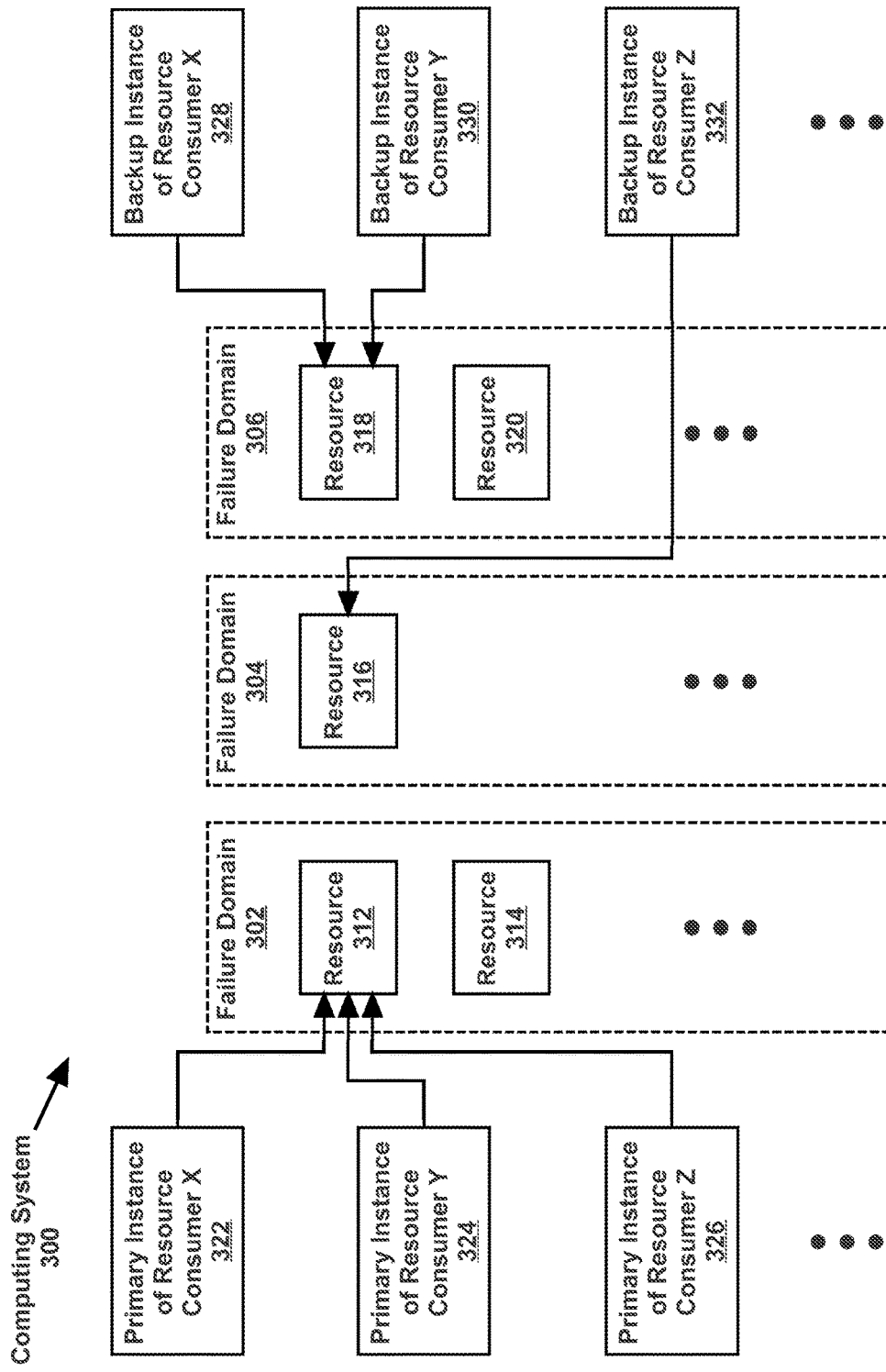
FIG. 3 illustrates an example of assigning resources to resource consumers using constraint programming, in accordance with one or more embodiments.

A detailed example is described below for purposes of clarity. Components and/or operations described below should be understood as one specific example which may not be applicable to certain embodiments. Accordingly, components and/or operations described below should not be construed as limiting the scope of any of the claims. FIG. 3 illustrates an example of assigning resources to resource consumers using constraint programming, in accordance with one or more embodiments.

As illustrated, computing system 300 includes at least failure domain 302, failure domain 304, and failure domain 306. Failure domain 302 includes at least resource 312 and resource 314. Failure domain 304 includes at least resource 316. Failure domain 306 includes at least resource 318 and resource 320. Computing system 300 further includes at least Resource Consumer X, Resource Consumer Y, and Resource Consumer Z.

A maximum load for resource 312 is 4. A maximum load for resource 314 is 2. A maximum load for resource 316 is 4. A maximum load for resource 318 is 5. A maximum load for resource 320 is 3. A maximum cluster size is 2.

Pairs of resources, each having two resources in different failure domains, are identified. The pairs of resources include at least the following:

Pair A (resource 312, resource 316)
Pair B (resource 312, resource 318)
Pair C (resource 312, resource 320)

A set of resource consumer elements are generated. A first resource consumer element represents Resource Consumer X. A second resource consumer element represents Resource Consumer Y. A third resource consumer element represents Resource Consumer Z. A domain of each resource consumer elements includes the identified pairs of resources. The domain of each resource consumer element includes at least: Pair A, Pair B, and Pair C.

A set of assigned load elements are generated. A first assigned load element represents an assigned load for Pair A. The first assigned load element has a domain that includes numbers equal to or less than a maximum load for Pair A. The maximum load for Pair A is the minimum of (a) the maximum load for resource 312 (which is 4) and (b) the maximum load for resource 316 (which is 4), which is determined as 4. The domain is {0, 1, 2, 3, 4}.

A second assigned load element represents an assigned load for Pair B. The second assigned load element has a domain that includes numbers equal to or less than a maximum load for Pair B. The maximum load for Pair B is the minimum of (a) the maximum load for resource 312 (which is 4) and (b) the maximum load for resource 318 (which is 5), which is determined as 4. The domain is {0, 1, 2, 3, 4}.

A third assigned load element represents an assigned load for Pair C. The third assigned load element has a domain that includes numbers equal to or less than a maximum load for Pair C. The maximum load for Pair C is the minimum of (a) the maximum load for resource 312 (which is 4) and (b) the maximum load for resource 320 (which is 3), which is determined as 3. The domain is {0, 1, 2, 3}.

A set of primary assigned load elements are generated. The set of primary assigned load elements includes at least primary assigned load elements corresponding to each of resource 312, resource 314, resource 316, resource 318, and resource 320. The domain of each primary assigned load element includes numbers that are equal to or less than a primary maximum load for the corresponding resource.

A set of backup assigned load elements are generated. The set of backup assigned load elements includes at least backup assigned load elements corresponding to each of resource 312, resource 314, resource 316, resource 318, and resource 320. The domain of each backup assigned load element includes numbers that are equal to or less than a backup maximum load for the corresponding resource.

Multiple sets of data model elements are generated, each set corresponding to pairs of resources having a same resource as a primary resource. In a particular set of data model elements, each data model element represents an assigned load for each pair of resources having resource 312 as a primary resource. Since each of Pair A, Pair B, and Pair C has resource 312 as a primary resource, the particular set of data model elements corresponds to Pair A, Pair B, and Pair C. Each data model element has a domain that includes numbers equal to or less than a maximum load for the pair of resources.

Multiple clustering elements are generated. A particular clustering element corresponds to pairs of resources having resource 312 as a primary resource, which is Pair A, Pair B, and Pair C. The particular clustering element represents a number of pairs of resources that (a) have resource 312 as a primary resource and (b) are assigned to no resource consumers. A minimum number of pairs of resources that (a) have resource 312 as a primary resource and (b) need to be assigned to no resource consumers is determined. The minimum number of pairs is determined as a difference between (a) a number of pairs of resources having resource 312 as a primary resource (which is, 3) and (b) the maximum cluster size (which is, 2). The minimum number of pairs is thus 1. A domain of the particular clustering element includes numbers equal to or greater than 1, including {1, 2}.

A global cardinality constraint is specified. The set of resource consumer elements are input as variable elements. The identified pairs of resources are input as value elements. The assigned load elements are input as counting elements. Based on the inputs, the global cardinality constraint specifies the following properties for a solution: (a) each resource consumer element may only be assigned to a value in the corresponding domain, (b) each pair of resources is assigned, to the resource consumer elements, a number of times that is equal to a value assumed by the corresponding assigned load element, and (c) each assigned load element may only assume a value in the corresponding domain.

A first deviation constraint is specified. The first deviation constraint limits a first deviation across the primary assigned load elements to be below a first threshold value, which is initially set to be zero.

A second deviation constraint is specified. The second deviation constraint limits a second deviation across the backup assigned load elements to be below a second threshold value, which is initially set to be zero.

A set of global cardinality constraints are specified, each corresponding to one of the multiple sets of data model elements. A particular cardinality constraint, in the set, corresponds to the particular set of data model elements corresponding to Pair A, Pair B, and Pair C. The particular set of data model elements is input as variable elements of the particular cardinality constraint. A single value zero is input as a value element. The particular clustering element corresponding to Pair A, Pair B, and Pair C is input as a counting element. The particular cardinality constraints specifies the following properties for a solution: (a) each data model element in the particular set may only assume a value in the corresponding domain, (b) the value zero is assumed, by the particular set of data model elements, a number of times that is equal to a value assumed by the particular clustering element, and (c) the particular clustering element may only assume a value in the corresponding domain.

A data model is generated, including: the set of resource consumer elements, the set of assigned load elements, the set of primary assigned load elements, the set of backup assigned load elements, the multiple sets of data model elements, the multiple clustering elements, the global cardinality constraint, the first deviation constraint, the second deviation constraint, and the set of global cardinality constraints.

The data model is applied to a constraint programming solver. The constraint programming solver returns a valid solution. The valid solution includes at least the following assignments: Resource Consumer X is assigned to Pair B; Resource Consumer Y is assigned to Pair B; and Resource Consumer Z is assigned to Pair A.

As illustrated in FIG. 3, based on the assignments, primary instance 322 of Resource Consumer X is assigned to resource 312. Primary instance 324 of Resource Consumer Y is assigned to resource 312. Primary instance 326 of Resource Consumer Z is assigned to resource 312. Backup instance 328 of Resource Consumer X is assigned to resource 318. Backup instance 330 of Resource Consumer Y is assigned to resource 318. Backup instance 332 of Resource Consumer Z is assigned to resource 316.

Resource 312 serves as the primary resource for Resource Consumer X, Resource Consumer Y, and Resource Consumer Z. Resource 316 serves as the backup resource for Resource Consumer Z. Resource 318 serves as the backup resource for Resource Consumer X and Resource Consumer Y.

A. Solution Satisfies the Global Cardinality Constraint

The solution satisfies the global cardinality constraint. The first resource consumer element (representing Resource Consumer X) has been assigned to a value in the domain of the first resource consumer element (which is, Pair B). The second resource consumer element (representing Resource Consumer Y) has been assigned to a value in the domain of the second resource consumer element (which is, Pair B). The third resource consumer element (representing Resource Consumer Z) has been assigned to a value in the domain of the second resource consumer element (which is, Pair A).

The first assigned load element (corresponding to Pair A) counts the number of times that Pair A is assigned, which is 1. The value 1 is within the domain of the first counting element. The second assigned load element (corresponding to Pair B) counts the number of times that Pair B is assigned, which is 2. The value 2 is within the domain of the second counting element. The third assigned load element (corresponding to Pair C) counts the number of times that Pair C is assigned, which is 0. The value 0 is within the domain of the third counting element.

By satisfying the global cardinality constraint, the objectives of resiliency and overloading prevention have been achieved.

B. Solution Satisfies the Particular Global Cardinality Constraint Corresponding to Pairs of Resources Having a Particular Resource as a Primary Resource The solution satisfies the particular global cardinality constraint, in the set of global cardinality constraints, corresponding to Pair A, Pair B, and Pair C. The first data model element (representing an assigned load for Pair A), in the particular set of data model elements, has assumed a value in the domain of the first data model element (which is, 1). The second data model element (representing an assigned load for Pair B) has assumed a value in the domain of the second data model element (which is, 2). The third data model element (representing an assigned load for Pair C) has assumed a value in the domain of the second data model element (which is, 0).

The particular clustering element (corresponding to Pair A, Pair B, and Pair C) counts the number of times that the value 0 is assumed by the particular set of data model elements, which is 1. The value 1 is within the domain of the particular clustering element.

By satisfying the particular global cardinality constraint, the objective of limiting network embedding to a maximum cluster size has been achieved at least with respect to pairs of resources wherein resource 312 serves as a primary resource. The remaining global cardinality constraints, in the set of global cardinality constraints, may be analyzed to determine whether the objective has been achieved with respect to the remaining pairs of resources in computing system 300.

C. Solution Satisfies the First Deviation Constraint and the Second Deviation Constraint Based on the assignment of other resource consumers (not shown) in the computing system, the primary assigned loads and the backup assigned loads for the resources of the computing system may be determined. The first deviation constraint may be analyzed using the primary assigned loads. The second deviation constraint may be analyzed using the second assigned loads.

If the first deviation constraint is satisfied using a first threshold value of zero, and the second deviation constraint is satisfied using a second threshold value of zero, then the objective of load balancing would be fully achieved.

Alternatively, the first threshold value and the second threshold value are increased. A valid solution with the smallest possible first threshold value and the smallest possible second threshold value are found. The solution has a minimal deviation across the assigned loads.

5. Cloud Environments

In one or more embodiments, a cloud environment provides a centralized pool of resources that are shared amongst multiple client devices. Examples of resources include a processor, a server, a data storage, a virtual machine, and a platform. Client devices may independently request computing services, such as server time and network storage, as needed. The resources are dynamically assigned to the client devices on an on-demand basis. The resources assigned to each particular client device may be scaled up or down based on the computing services requested by the particular client device. The resources assigned to each particular client device may also be scaled up or down based on the aggregated demand for computing services requested by all client devices.

In an embodiment, the resources of a cloud environment are accessible over a network, such as a private network or the Internet. One or more physical and/or virtual client devices demanding use of the resources may be local to or remote from the resources. The client devices may be any type of computing devices, such as computers or smartphones, executing any type of operating system. The client devices communicate requests to the resources using a communications protocol, such as Hypertext Transfer Protocol (HTTP). The requests are communicated to the resources through an interface, such as a client interface (such as a web browser), a program interface, or an application programming interface (API).

In an embodiment, a cloud service provider provides a cloud environment to one or more cloud users. Various service models may be implemented by the cloud environment, including but not limited to Software-as-a-Service (SaaS), Platform-as-a-Service (PaaS), and Infrastructure-as-a-Service (IaaS). In SaaS, a cloud service provider provides cloud users the capability to use the cloud service provider's applications, which are executing on the cloud resources. In PaaS, the cloud service provider provides cloud users the capability to deploy onto the cloud resources custom applications, which are created using programming languages, libraries, services, and tools supported by the cloud service provider. In IaaS, the cloud service provider provides cloud users the capability to provision processing, storage, networks, and other fundamental computing resources provided in the cloud environment. Any arbitrary applications, including an operating system, may be deployed on the cloud resources.

In an embodiment, various deployment models may be implemented by a cloud environment, including but not limited to a private cloud, a public cloud, and a hybrid cloud. In a private cloud, cloud resources are provisioned for exclusive use by a particular group of one or more entities (the term "entity" as used herein refers to a corporation, organization, person, or other entity). The cloud resources may be located on the premises of one or more entities in the particular group, and/or at one or more remote off-premise locations. In a public cloud, cloud resources are provisioned for multiple entities (also referred to herein as "tenants"). Several tenants may use a same particular resource, such as a server, at different times and/or at the same time. In a hybrid cloud, the cloud environment comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In a multi-tenant environment, where multiple tenants share a same pool of resources 112, tenant isolation is implemented. Each tenant corresponds to a unique tenant identifiers (IDs). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In an embodiment, data sets corresponding to various tenants are stored as entries in a database. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In an embodiment, data sets corresponding to various tenants are stored in different databases or data structures. Each database or data structure is tagged with the tenant ID of the corresponding tenant. A request for access to a particular data set is tagged with the tenant ID of the tenant making the request. The tenant ID associated with the request is checked against the tenant ID associated with the database or data structure storing the data set to be accessed. If the tenant IDs are the same, then access to the database or data structure is permitted.

In an embodiment, a subscription list indicates which tenants have authorization to access which applications. For each application, a list of tenant IDs of each tenant having authorization to access the application is stored. A request for access to a particular application is tagged with the tenant ID of the tenant making the request. The tenant ID associated with the request is checked against the subscription list to determine whether the tenant is authorized to access the application. If the tenant ID associated with the request is included in the list of tenant IDs of tenants having authorization to access the application, then access to the application is permitted.

In an embodiment, data sets and virtual resources (e.g., virtual machines, application instances, and threads) corresponding to different tenants are isolated to tenant-specific overlay networks maintained by the cloud environment. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying pairs of resources from a plurality of resources, each pair of resources comprising two resources in different failure domains of a plurality of failure domains;
   identifying a plurality of resource consumers, wherein each resource consumer of the plurality of resource consumers is associated with (a) a primary instance and (b) a backup instance;
   specifying a set of one or more constraints that limit assignment of the plurality of resource consumers to the plurality of resources to: assigning the plurality of resource consumers respectively to the pairs of resources;
   creating a data model, applicable to a constraint programming solver, comprising:
      a first plurality of data model elements corresponding respectively to the pairs of resources;
      a second plurality of data model elements corresponding respectively to the plurality of resource consumers; and
      the set of constraints;
   causing application of the data model to the constraint programming solver to assign a respective pair of resources, from the pairs of resources, to each resource consumer of the plurality of resource consumers; and
   assigning the respective pair of resources to each resource consumer of the plurality of resource consumers based on the data model, comprising:
   assigning a first resource of a particular pair of resources to the primary instance of a particular resource consumer of the plurality of resource consumers, and
   assigning a second resource of the particular pair of resources to the backup instance of the particular resource consumer of the plurality of resource consumers.

2. The medium of claim 1, wherein assigning the plurality of resource consumers respectively to the pairs of resources comprises assigning (a) the primary instance of a particular resource consumer to a first resource of a particular pair of resources and (b) the backup instance of the particular resource consumer to a second resource of the particular pair of resources.

3. The medium of claim 1, wherein the set of constraints further limit assignment of the plurality of resource consumers to the plurality of resources to: requiring a number of resource consumers that are assigned to a particular pair of resources being below a maximum number of resource consumers corresponding to the particular pair of resources.

4. The medium of claim 3, wherein:
   the data model further comprises:
      a third plurality of data model elements corresponding respectively to assigned loads of the pairs of resources; and
   the set of constraints are specified using a global cardinality constraint that accepts as input:
      the first plurality of data model elements, the second plurality of data model elements, and the third plurality of data model elements.

5. The medium of claim 1, wherein the set of constraints further limit assignment of the plurality of resource consumers to the plurality of resources to: requiring a deviation across a number of primary instances of resource consumers corresponding to each of the plurality of resources being below a threshold value.

6. The medium of claim 1, wherein the set of constraints further limit assignment of the plurality of resource consumers to the plurality of resources to: requiring a deviation across a number of backup instances of resource consumers corresponding to each of the plurality of resources being below a threshold value.

7. The medium of claim 1, wherein the set of constraints further limit assignment of the plurality of resource consumers to the plurality of resources to:
   assigning backup instances of a particular set of resource consumers to a maximum number of resources, wherein the primary instances of the particular set of resource consumers are assigned to a same resource.

8. The medium of claim 1, wherein the set of constraints further limit assignment of the plurality of resource consumers to the plurality of resources to: requiring no resource consumers to be assigned to a minimum number of a subset of the pairs of resources, wherein each pair in the subset comprises a same resource.

9. The medium of claim 1, wherein the operations further comprise applying the constraint programming solver to the data model to assign a particular pair of resources from the pairs of resources to each resource consumer in the plurality of resource consumers.

10. The medium of claim 1, wherein:
   assigning the plurality of resource consumers respectively to the pairs of resources comprises assigning (a) the primary instance of a particular resource consumer to a first resource of a particular pair of resources and (b) the backup instance of the particular resource consumer to a second resource of the particular pair of resources;
   the set of constraints further limit assignment of the plurality of resource consumers to the plurality of resources to:
      requiring a number of resource consumers that are assigned to a particular pair of resources being below a maximum number of resource consumers corresponding to the particular pair of resources;
      requiring a deviation across a number of primary instances of resource consumers corresponding to each of the plurality of resources being below a threshold value;

requiring a deviation across a number of backup instances of resource consumers corresponding to each of the plurality of resources being below a threshold value;

assigning backup instances of a particular set of resource consumers to a maximum number of resources, wherein the primary instance of the particular set of resource consumers are assigned to a same resource;

requiring no resource consumers to be assigned to a minimum number of a subset of the pairs of resources, wherein each pair in the subset comprises a same resource;

the operations further comprise:

applying the constraint programming solver to the data model to assign a particular pair of resources from the pairs of resources to each resource consumer in the plurality of resource consumers.

11. A system comprising:

at least one hardware device including a processor;

the system configured to perform operations comprising:

identifying pairs of resources from a plurality of resources, each pair of resources comprising two resources in different failure domains of a plurality of failure domains;

identifying a plurality of resource consumers, wherein each resource consumer of the plurality of resource consumers is associated with (a) a primary instance and (b) a backup instance;

specifying a set of one or more constraints that limit assignment of the plurality of resource consumers to the plurality of resources to: assigning the plurality of resource consumers respectively to the pairs of resources;

creating a data model, applicable to a constraint programming solver, comprising:

a first plurality of data model elements corresponding respectively to the pairs of resources;

a second plurality of data model elements corresponding respectively to the plurality of resource consumers; and the set of constraints;

causing application of the data model to the constraint programming solver to assign a respective pair of resources, from the pairs of resources, to each resource consumer of the plurality of resource consumers; and assigning the respective pair of resources to each resource consumer of the plurality of resource consumers based on the data model, comprising:

assigning a first resource of a particular pair of resources to the primary instance of a particular resource consumer of the plurality of resource consumers, and assigning a second resource of the particular pair of resources to the backup instance of the particular resource consumer of the plurality of resource consumers.

12. The system of claim 11, wherein assigning the plurality of resource consumers respectively to the pairs of resources comprises assigning (a) the primary instance of a particular resource consumer to a first resource of a particular pair of resources and (b) the backup instance of the particular resource consumer to a second resource of the particular pair of resources.

13. The system of claim 11, wherein the set of constraints further limit assignment of the plurality of resource consumers to the plurality of resources to: requiring a number of resource consumers that are assigned to a particular pair of resources being below a maximum number of resource consumers corresponding to the particular pair of resources.

14. The system of claim 11, wherein the set of constraints further limit assignment of the plurality of resource consumers to the plurality of resources to: requiring a deviation across a number of resource consumers corresponding to each of the plurality of resources being below a threshold value.

15. The system of claim 11, wherein the set of constraints further limit assignment of the plurality of resource consumers to the plurality of resources to: requiring a deviation across a number of primary instances of resource consumers corresponding to each of the plurality of resources being below a threshold value.

16. The system of claim 11, wherein the set of constraints further limit assignment of the plurality of resource consumers to the plurality of resources to: requiring a deviation across a number of backup instances of resource consumers corresponding to each of the plurality of resources being below a threshold value.

17. The system of claim 11, wherein the set of constraints further limit assignment of the plurality of resource consumers to the plurality of resources to:

assigning backup instances of a particular set of resource consumers to a maximum number of resources, wherein the primary instance of the particular set of resource consumers are assigned to a same resource.

18. A method comprising:

identifying pairs of resources from a plurality of resources, each pair of resources comprising two resources in different failure domains of a plurality of failure domains;

identifying a plurality of resource consumers, wherein each resource consumer of the plurality of resource consumers is associated with (a) a primary instance and (b) a backup instance;

specifying a set of one or more constraints that limit assignment of the plurality of resource consumers to the plurality of resources to: assigning the plurality of resource consumers respectively to the pairs of resources;

creating a data model, applicable to a constraint programming solver, comprising:

a first plurality of data model elements corresponding respectively to the pairs of resources;

a second plurality of data model elements corresponding respectively to the plurality of resource consumers; and the set of constraints;

causing application of the data model to the constraint programming solver to assign a respective pair of resources, from the pairs of resources, to each resource consumer of the plurality of resource consumers; and assigning the respective pair of resources from the pairs of resources to each resource consumer of the plurality of resource consumers based on the data model, comprising:

assigning a first resource of a particular pair of resources to the primary instance of a particular resource consumer of the plurality of resource consumers, and assigning a second resource of the particular pair of resources to the backup instance of the particular resource consumer of the plurality of resource consumers;

wherein the method is performed by at least one device including a hardware processor.

* * * * *